No. 864,989. PATENTED SEPT. 3, 1907.
F. H. RICHARDS.
FASTENING DEVICE FOR ADJUSTABLE COLLARS.
APPLICATION FILED DEC. 28, 1900. RENEWED FEB. 7, 1906.
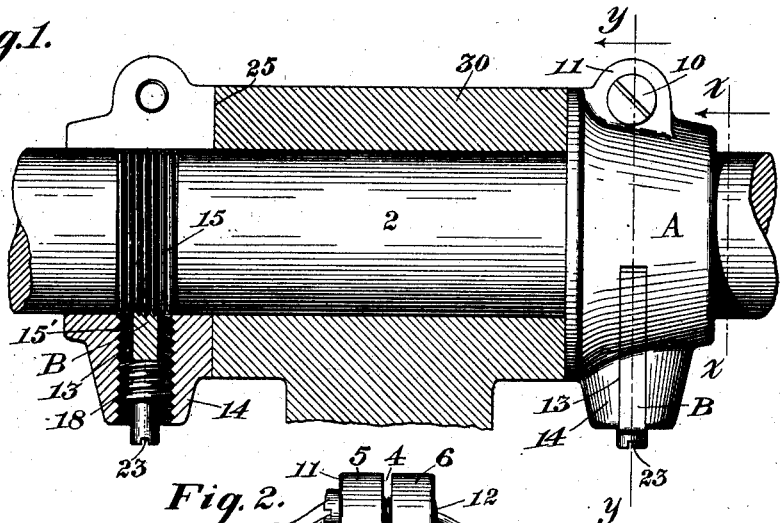
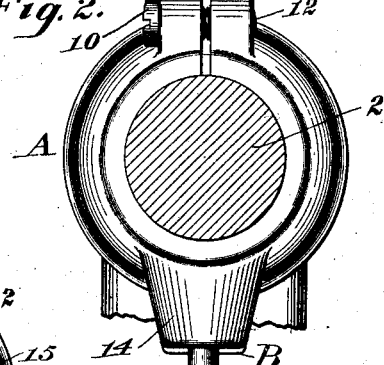
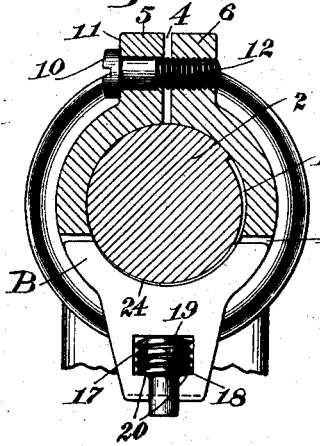
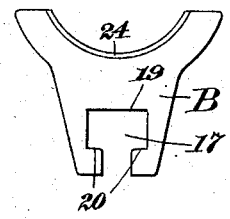
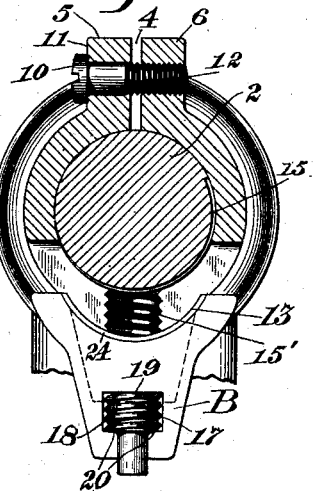
Witnesses.
A. B. Mattingly
Inventor
F. H. Richards

UNITED STATES PATENT OFFICE.

FRANCIS H. RICHARDS, OF HARTFORD, CONNECTICUT.

FASTENING DEVICE FOR ADJUSTABLE COLLARS.

No. 864,989.  Specification of Letters Patent.  Patented Sept. 3, 1907.

Application filed December 28, 1900, Serial No. 41,348. Renewed February 7, 1906. Serial No. 299,949.

*To all whom it may concern:*

Be it known that I, FRANCIS H. RICHARDS, a citizen of the United States, residing at Hartford, in the county of Hartford and State of Connecticut, have invented certain new and useful Improvements in Fastening Devices for Adjustable Collars, of which the following is a specification.

This invention relates to fastening devices for adjustable collars, and especially to adjustable clamping collars which are divided or split for the purpose of engaging suitable machine elements, the principal object of the invention being to provide an improved adjustable clamping collar which may be adjusted and held with great accuracy and rigidity relatively to a machine element—such as a spindle—by which it is carried and by means of which such element or spindle may be adjusted and held with like accuracy and rigidity relatively to the bearing or other member in which it rotates or by which it is supported.

In the drawings accompanying this specification and forming a part of the present application, Figure 1 is a central longitudinal section partly in elevation of a shaft or spindle and a bearing therefor, said shaft having two of my improved collars secured thereto. Fig. 2 is a transverse section of the same, the section being taken in line x—x, Fig. 1, looking toward the left in said figure. Fig. 3 is a transverse section of the same, the section being taken in line y—y, Fig. 1, illustrating the fastening device or collar clamped on the spindle with its auxiliary clamp in its effective position. Fig. 4 is a similar view showing a different position of the same. Fig. 5 is a side elevation of said auxiliary clamp; and Fig. 6 is a similar view of a device for actuating the auxiliary clamp.

Similar characters designate like parts in the different figures of the drawings.

The principal features of my improved fastening device are main and auxiliary clamping devices associated in such a manner that the clamping effect of each is modified by the other, the construction in which the invention is embodied comprising usually a split clamping collar for encircling a carrier or driver, an auxiliary carrier-engaging clamp carried by and adjustable relatively to the collar, and means for drawing the ends of the collar together, the parts being so combined that when they are properly positioned the clamping collar will engage the carrier substantially in the manner well known in the art, while the auxiliary clamp will exert a separate and additional gripping action upon the carrier and thus increase the frictional resistance of the engaging surfaces and assure a very firm grip upon such carrier.

The collar, which forms one of the principal members of the fastening device, may be of any suitable type—such, for example, as that shown herein at A— and is intended to be clamped to a carrier, this being usually a cylindrical shaft or spindle, such as 2. This collar is preferably divided or split, as indicated at 4, and means are provided in connection therewith for drawing the two ends of the collar together and thereby reducing the length of the clamping surface and the area of the space inclosed thereby, so as to exert a proper clamping action upon the carrier or spindle. A clamping screw, such as 10, will ordinarily be employed for the purpose of drawing the ends of the split collar closer together, the head of this screw preferably bearing in the usual manner against a shoulder 11 at one end 5 of the collar, while the threaded end 12 of the screw engages the threads of a bored opening in the other end 6 of the collar. This construction is the usual one for clamping a divided collar on, and releasing it from, a shaft or spindle.

For the purpose of adjusting the clamping device or collar A lengthwise of the shaft 2 and locating it in any desired adjusted position, said shaft may have at a suitable point in the length thereof a screw-threaded portion, such as 15, the threads extending preferably only a short distance lengthwise of the shaft and being relatively fine, and these threads may coact with an auxiliary carrier-engaging clamp, which may be brought into engagement with said threads and held firmly in contact therewith. The threads 15 may be relatively shallow and need not extend entirely around the shaft, (see Figs. 3 and 4,) although this feature is not essential.

The auxiliary carrier-engaging clamp just referred to is intended to coöperate with the main clamping device or collar for the purpose of gripping the carrier and increasing the clamping action. This auxiliary carrier-engaging clamp in the construction shown is carried by, and is adjustable relatively to, the collar, said clamp being preferably a device of the type illustrated at B. It will usually be guided in a slot, such as 13, in a boss or housing 14, projecting from, and preferably integral with, the collar A, the opening 13 being here of such a width as to prevent movement of the clamp B longitudinally of the collar, while permitting it to be shifted toward or from the spindle 2 to engage or release the same.

It will be noticed that the clamp B is disposed substantially opposite, and in the same plane with, the clamping screw 10, and hence the clamping actions controlled by said screw and clamp will be exerted upon the carrier or spindle 2 substantially in the same transverse plane and thus the maximum clamping or frictioning action will result. It will be noted also that this auxiliary clamp exerts a clamping action separate from, and in addition to, that of the collar when such clamp is in its working position, and hence the main and auxiliary clamping devices—viz., the collar A and the clamp B—by reaction serve each to increase the clamping effect of the other and to tighten the hold of the fastening device upon the carrier.

For the purpose of operating the clamp B, I may make use of any suitable actuating device that will serve to move said clamp and hold it in engagement with the shaft, but I prefer to employ an actuator substantially of the type herein shown. This auxiliary clamp-adjusting actuator is here a screw having a threaded portion the diameter of which is somewhat in excess of the thickness of the auxiliary clamping device B, and said screw, which is designated by 18, is intended to engage the threads of a bored opening 15′, ranging longitudinally and substantially centrally of the guide opening or slot 13. The clamp B preferably has at the outer end thereof an opening, such as a T-slot 17, similar in outline to the cross-sectional shape of the screw 18, for the purpose of receiving the latter and permitting it to operate the clamp. The narrow end of this opening receives the head of the screw 18, while the wide portion thereof receives the large threaded body of the screw, the opposite end walls 19 and 20 of the main portion of the opening forming shoulders for engaging the opposite ends 21 and 22 of the screw 18. For the purpose of operating the screw it may have the usual slot 23 therein for the reception of the point of a screw-driver, whereby it may be turned to adjust the clamp B toward or from the carrier 2.

In applying the collar A to a spindle or shaft such as 30 the locking member B is drawn back so that its inner end 24, which preferably has screw-threads similar to those shown at 15, is outside the bore of the collar, and when the clamping screw 10 is loosened said collar may be slid to any desired position along the shaft or carrier 2 opposite the screw-threads 15. The collar being now approximately in the desired position the screw 18 will be turned to force the auxiliary clamp B into engagement with the threads 15, when the collar may be turned upon the shaft until it is accurately adjusted lengthwise thereof, it being possible in this manner to obtain a very fine adjustment of its bearing face 25, for example, with respect to the adjacent cheek of the bearing in which the spindle 2 may be mounted. Thereupon the clamping screw 10 may be tightened to bring the two ends 5 and 6 of the collar closer together and clamp said collar firmly upon the spindle.
It will be observed that when the collar is applied to the shaft in the manner just described the opposite ends thereof are separated by a considerable space and substantially the whole clamping surface of the collar is clear of the shaft. For this reason, when the clamp B is forced against the shaft, it will tend to draw the collar away from the latter on the side at which such auxiliary clamp is located. This would normally leave a slight opening between the shaft and the collar at points adjacent to the auxiliary clamp, or at least would prevent the collar from bearing firmly against the shaft at those points, but owing to the engagement of the whole surface of the auxiliary clamp with the shaft at such points the entire surface of such shaft adjacent to the auxiliary clamp is in clamping engagement with the fastening device.

In devices of the class described herein it is well known that the precise relationship of the parts is materially modified as regards alinement, &c., by the degree of pressure to which the parts are subjected, and it will be noted that the operation of forcing the auxiliary clamp against the spindle by means of the actuator or screw 18 will ordinarily be effected by the application of only a moderate amount of force. The operation of setting the collar in place being performed while the collar at a point approximately opposite—that is, at the ends thereof—is unclamped throws the collar slightly out of its normal position on the shaft, but on drawing the ends of said collar together, as by means of the relatively powerful clamping screw 10, the wedging action of the divided ends of the collar increases the pressure on the auxiliary clamp and also serves to wrap the collar firmly against the surface of the spindle and thereby hold all of the parts together in their positions of final adjustment with great power and rigidity.

My improved fastening device is adapted for use in machines of many kinds, and is so rigid that it is safe against dislocation due to the intense jarring action to which such machines are often subjected, as has been fully demonstrated in practice.

Having described my invention, I claim—

1. The combination with a shaft having a threaded section, of a collar slidably mounted thereon, and a threaded member mounted on the collar and shiftable toward and away from the shaft to engage with and be disengaged from the threaded section thereof.

2. The combination, with an externally-threaded carrier, of a split clamping collar slidably fitted to said carrier; an auxiliary carrier-engaging clamp carried by, and adjustable relatively to, the collar, and having a threaded clamping face coöperative with the threaded portion of the carrier; and means for drawing the ends of the split collar toward each other.

3. The combination, with a carrier, of a split clamping collar slidably fitted to said carrier; an auxiliary threaded clamp carried by, and adjustable relatively to, the collar; and means for drawing the ends of the split collar toward each other.

4. The combination, with a carrier, of a split clamping collar slidably fitted to said carrier; an auxiliary threaded clamp carried by, and adjustable relatively to, the collar; an auxiliary-clamp actuator also carried by said collar; and means for drawing the ends of the split collar toward each other.

5. The combination, with a carrier, of a split clamping collar slidably fitted to said carrier; an auxiliary threaded guided clamp carried by, and adjustable relatively to, said collar and to said carrier; an auxiliary-clamp-adjusting screw carried by said collar; and means for drawing the ends of the split collar toward each other.

6. The combination with a shaft, of a split collar slidably mounted thereon and having means for closing the collar and thereby clamping the same to the shaft and a threaded member mounted on the collar diametrically opposite the opening therein and shiftable toward and away from the shaft to engage with and be disengaged from the threaded section thereof.

7. The combination with a shaft having a threaded section, of a split collar slidably mounted thereon and having means for closing the collar and thereby clamping the same to the shaft and a threaded member mounted in a guideway on the collar diametrically opposite the opening therein and shiftable toward and away from the shaft to engage with and be disengaged from the threaded section thereof.

8. The combination with a shaft, of a split collar slidably mounted thereon and having means for closing the collar and thereby clamping the same to the shaft and a threaded member mounted on the collar diametrically opposite the opening therein and shiftable toward and away from the shaft to engage with and be disengaged from a threaded section thereof, the threaded portion of said member extending a substantial distance around the shaft.

9. The combination with a shaft having a threaded section, of a collar slidably mounted thereon, a threaded member mounted on the collar and shiftable toward and away from the shaft to engage with and be disengaged from the threaded section thereof and means for forcing said member against the shaft and into engagement with the threaded section.

10. The combination with a shaft, of a collar slidably mounted thereon, a threaded member mounted on the collar and shiftable toward and away from the shaft to engage with and be disengaged from a threaded section thereof, and a screw for forcing said member against the shaft and into engagement with the threaded section.

11. The combination with a shaft, of a clamping collar slidably mounted thereon, a threaded member mounted in a guideway of the collar and shiftable toward and away from the shaft to engage with and be disengaged from a threaded section thereof, and a screw for forcing said member against the shaft and into engagement with said threaded section, the threaded portion of said member extending a substantial distance around the shaft.

12. The combination with a shaft, of a split collar slidably mounted thereon, means for closing the collar and thereby clamping the same to the shaft, a threaded member mounted in the guideway of the collar diametrically opposite the opening therein and shiftable toward and away from the shaft to engage with and be disengaged from a threaded section thereof, and a screw for adjusting said member, said screw being located in an opening in the collar and coöperating with the end walls of said opening as well as shoulders on said member.

13. The combination of a shaft, a collar slidably mounted thereon, and a member adjustably mounted on the collar and shiftable toward and away from the shaft to engage with and be disengaged from a threaded section thereof.

14. The combination with a shaft, of a collar mounted thereon, means for frictionally holding said collar upon the shaft against angular and axial displacement relative thereto, and means for axially adjusting the collar upon angular movement thereof and for preventing axial displacement of such collar unaccompanied by angular movement and having a plurality of separated faces coöperating with similar separated parts of the shaft.

15. The combination with a shaft having a threaded section, of a collar slidably mounted thereon, means for tightening the collar, and a threaded member mounted on the collar and shiftable toward and away from the threaded section thereof.

16. The combination with a shaft having a screw threaded section, of a clampable collar slidably mounted thereon, and a member mounted on the collar and shiftable toward and from the shaft to engage and be disengaged therefrom.

17. The combination with a split collar and means for closing the same upon a shaft or the like, of means for engaging the shaft upon the side opposite the split, said shaft and means having each a plurality of coöperating separated engaging faces.

18. The combination of a split collar and means for closing the same upon a shaft or the like, of means for engaging the shaft with screw threaded engagement upon the side opposite the split.

19. The combination with a split collar and means for closing the same upon a shaft or the like, of means for partially embracing the shaft with screw threaded engagement upon the side opposite the split.

20. The combination with a collar and means for closing the same on a member, of means for axially adjusting the collar relative to said member and comprising a member having a plurality of separated faces engaging corresponding faces on said first member.

21. The combination with a collar and means for clamping the same on a member, of means coöperative with the clamping means when performing its work and for axially adjusting the collar when said clamping means is idle and having a plurality of separated faces engaging corresponding faces on said member.

FRANCIS H. RICHARDS.

Witnesses:
 FRED. J. DOLE,
 C. E. VOSS.